US006375576B1

(12) United States Patent
Margerie

(10) Patent No.: US 6,375,576 B1
(45) Date of Patent: Apr. 23, 2002

(54) MECHANICAL TRANSMISSION MEMBER AND ITS APPLICATION TO A MECHANICAL CONSTANT VELOCITY JOINT

(75) Inventor: Michel Margerie, Vetheuil (FR)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/623,748

(22) PCT Filed: Feb. 16, 1999

(86) PCT No.: PCT/FR99/00346

§ 371 Date: Nov. 9, 2000

§ 102(e) Date: Nov. 9, 2000

(87) PCT Pub. No.: WO99/45287

PCT Pub. Date: Sep. 10, 1999

(30) Foreign Application Priority Data

Mar. 5, 1998 (FR) .............................. 98 02721

(51) Int. Cl.[7] .............................................. F16D 3/205
(52) U.S. Cl. .................... 464/111; 464/123; 464/905
(58) Field of Search .................... 464/111, 112, 464/122, 123, 124, 129, 130, 132, 905

(56) References Cited

U.S. PATENT DOCUMENTS

| 4,192,154 A | * | 3/1980 | Nakamura et al. | ........... 464/111 |
| 4,571,214 A | * | 2/1986 | Orain | ........................ 464/111 |
| 5,376,049 A | * | 12/1994 | Welschof et al. | ............ 464/111 |
| 5,573,464 A | * | 11/1996 | Hofmann et al. | ............ 464/111 |
| 5,591,085 A | * | 1/1997 | Stall et al. | ................... 464/111 |
| 5,658,199 A | * | 8/1997 | Ricks et al. | ................. 464/111 |
| 6,227,978 B1 | * | 5/2001 | Maucher et al. | ............. 464/111 |

FOREIGN PATENT DOCUMENTS

| DE | 36 12 800 A1 | 10/1987 |
| DE | 43 05 278 C1 | 7/1994 |
| DE | 43 27 036 A1 | 2/1995 |
| DE | 43 27 606 A1 | 2/1995 |
| DE | 93 21 255 U1 | 11/1996 |
| EP | 0 336 600 A1 | 10/1989 |
| FR | 1 391 770 | 10/1965 |
| GB | 1 259 980 | 1/1972 |

* cited by examiner

*Primary Examiner*—Lynne H. Browne
*Assistant Examiner*—Kenn Thompson

(57) ABSTRACT

The invention concerns a mechanical transmission member comprising an inner ring (9), an outer ring (11) and pivot linkage means (12) for coupling the inner and outer rings. The pivot linkage means compromise means for axially retaining the outer ring relative to the inner ring, wherein are comprised at least an axially abutment collar (30, 31) co-operating with an annular radially internal groove (16, 17) of the outer ring and with an axially external surface (23, 24) of the inner ring, and at least an elastic snap ring (32, 33) co-operating with an axially external retaining surface (18, 19) of a groove and with the abutment collar support surface (42, 43). The invention is applicable to tripod constant velocity joints for motor vehicle transmission systems.

10 Claims, 5 Drawing Sheets

Figure 1:
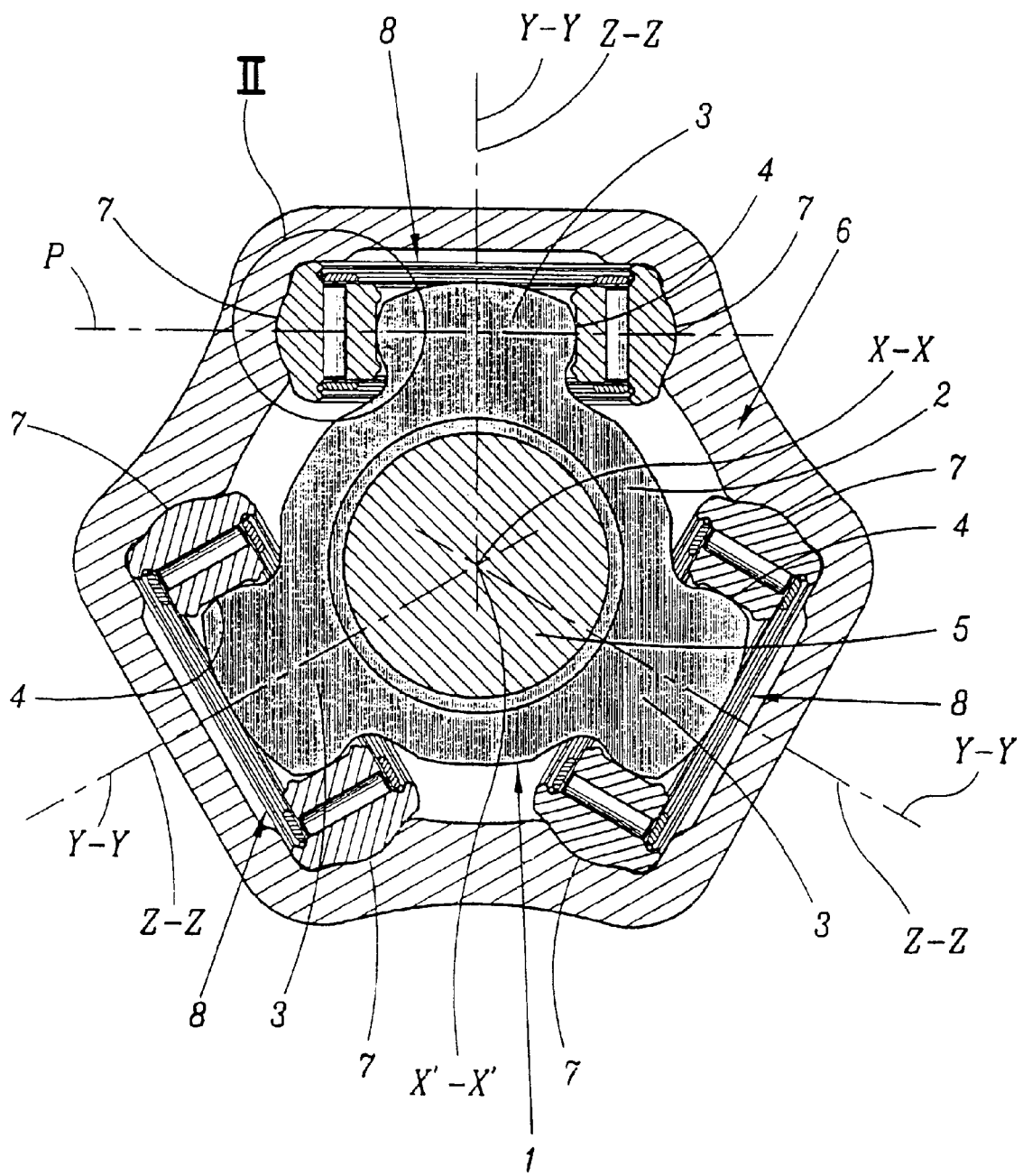

MECHANICAL TRANSMISSION MEMBER AND ITS APPLICATION TO A MECHANICAL CONSTANT VELOCITY JOINT

The present invention relates to a mechanical transmission member of the type comprising an inner race ring, an outer race ring surrounding the inner race ring and means of coupling the inner and outer race rings together, allowing them to pivot relative to one another about their common axis, the coupling means comprising means for axially retaining the outer race ring with respect to the inner race ring, these retaining means comprising at least one axial thrust washer which interacts with an annular groove radially on the inside of the outer race ring and with a surface which is axially on the outside of the inner race ring.

The invention applies in particular to tripod constant-velocity mechanical joints for motor vehicle transmissions.

These tripod constant-velocity joints generally comprise a male element with ternary symmetry, or tripod, secured to a first rotating shaft, and a female element with ternary symmetry, or bell housing, secured to a second rotary shaft.

The male element has three arms and the female element delimits three pairs of runway tracks. A mechanical transmission member of the above-defined type is mounted on each arm of the tripod.

The inner race ring of a mechanical transmission member such as this rolls and slides along the corresponding arm. The outer race ring is a roller intended to run along the corresponding pair of tracks to allow the constant-velocity joint to operate when the two rotary shafts are out of alignment, forming an angle between them.

The connection between the inner race ring and the outer roller needs to be a connection which allows free rotation about their common axis and translation along this axis, which translation is restricted to a clearance needed for assembly.

Rotation about the common axis of symmetry is allowed by rolling-bearing means, generally of the needle-bearing type, arranged between the inner race ring and the outer roller. The means of axial retention, for their part, prevent substantial translation, along the axis of symmetry, of the inner race ring and of the outer roller.

Hitherto, these means of axial retention comprise, for each mechanical transmission member, two thrust washers which are flat, elastic and split washers. Of each thrust washer, its peripheral edge is housed in an annular groove in the outer race ring and one of its surfaces bears against the corresponding axially outer surface of the inner race ring. The grooves in the roller are of rectangular cross section and therefore weaken the rollers.

The thrust washers are very rigid and need to hold very tight tolerances which are associated directly with the dimensions of the grooves in the outer roller, so that once the transmission member has been assembled, the split thrust washers are practically closed up.

Manufacturing the grooves and the thrust washers, and fitting the latter into the grooves in the outer rollers, which entails special-purpose equipment, are expensive operations.

The object of the invention is to solve these problems by providing a mechanical transmission member of reduced weakness and reduced manufacture and assembly cost, in particular allowing manual assembly of its constituent parts.

To this end, the subject of the invention is a mechanical transmission member of the aforementioned type, characterized in that the means of axial retention further comprise at least one elastic snap ring, especially a split ring, interacting with a retaining surface which is axially on the outside of the groove and with a bearing surface of the thrust washer for axially retaining the latter.

According to some particular embodiments of the invention, the mechanical transmission member may have one or more of the following features, taken in isolation or in any technically feasible combination:

the elastic snap ring is of approximately circular cross section;

the retaining surface of the corresponding groove converges axially towards the outside of the member, and the bearing surface of the corresponding thrust washer converges axially towards the outside of the member to a lesser extent than the said retaining surface;

said bearing surface is extended axially towards the outside of the member by a surface for insertion of the said snap ring, this insertion surface converging axially towards the outside of the member at an angle which is at least equal to that of the said retaining surface of the groove;

said retaining surface and the said bearing surface are approximately frustaconical;

said thrust washer has concaveness facing axially towards the outside of the member and at least part of the peripheral edge face of this thrust washer constitutes the said bearing surface;

said thrust washer has concaveness facing axially towards the inside of the member and part of the axially outer surface of the said thrust washer constitutes the said bearing surface;

the member is intended to be mounted on an arm about which the inner race ring rolls and slides, and the member further comprises at least one element projecting radially towards the inside with respect to the inner race ring, for axially retaining the member on the arm;

the said retaining element is a retaining washer which, on the one hand, is held between the thrust washer and the corresponding axially outer surface of the inner race ring and, on the other hand, is intended to interact with the said arm to provide the said axial retention; and the radially outer edge of the said retaining washer is housed in a counterbore of the radially inner edge of the corresponding thrust washer.

A final subject of the invention is a constant-velocity mechanical joint, comprising a male element comprising several arms, a female element delimiting two race tracks for each arm and, for each arm, a mechanical transmission member mounted on said arm, this mechanical transmission member comprising an inner race ring that can swivel about said arm, an outer race ring forming a roller surrounding the inner race ring and rolling along the two associated race tracks of the female element, and means for coupling the race ring and the roller in a pivoting way allowing relative pivoting about their common axis, characterized in that at least one mechanical transmission member is a mechanical transmission member as defined hereinabove.

Figure 2:
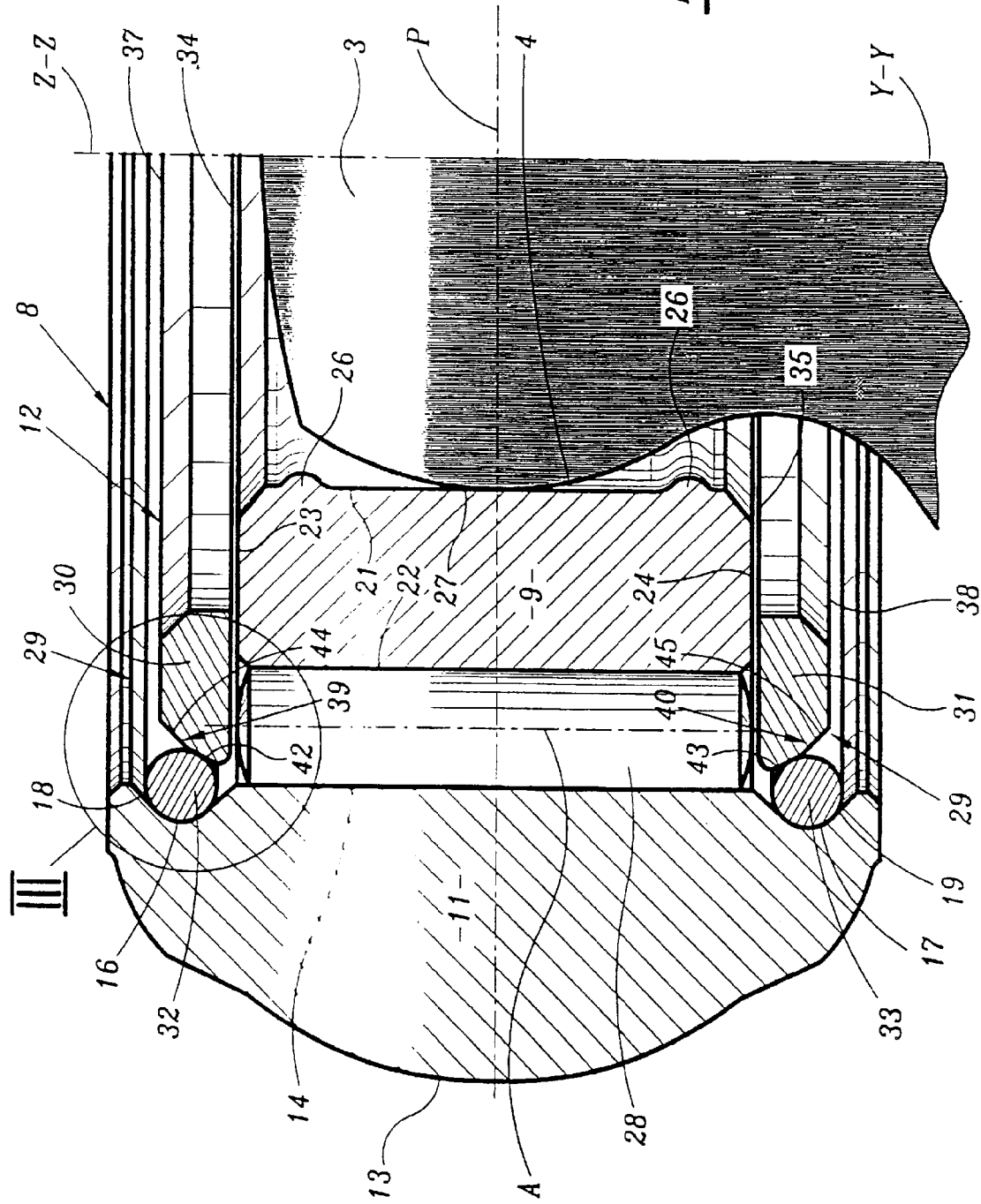
Figure 3:
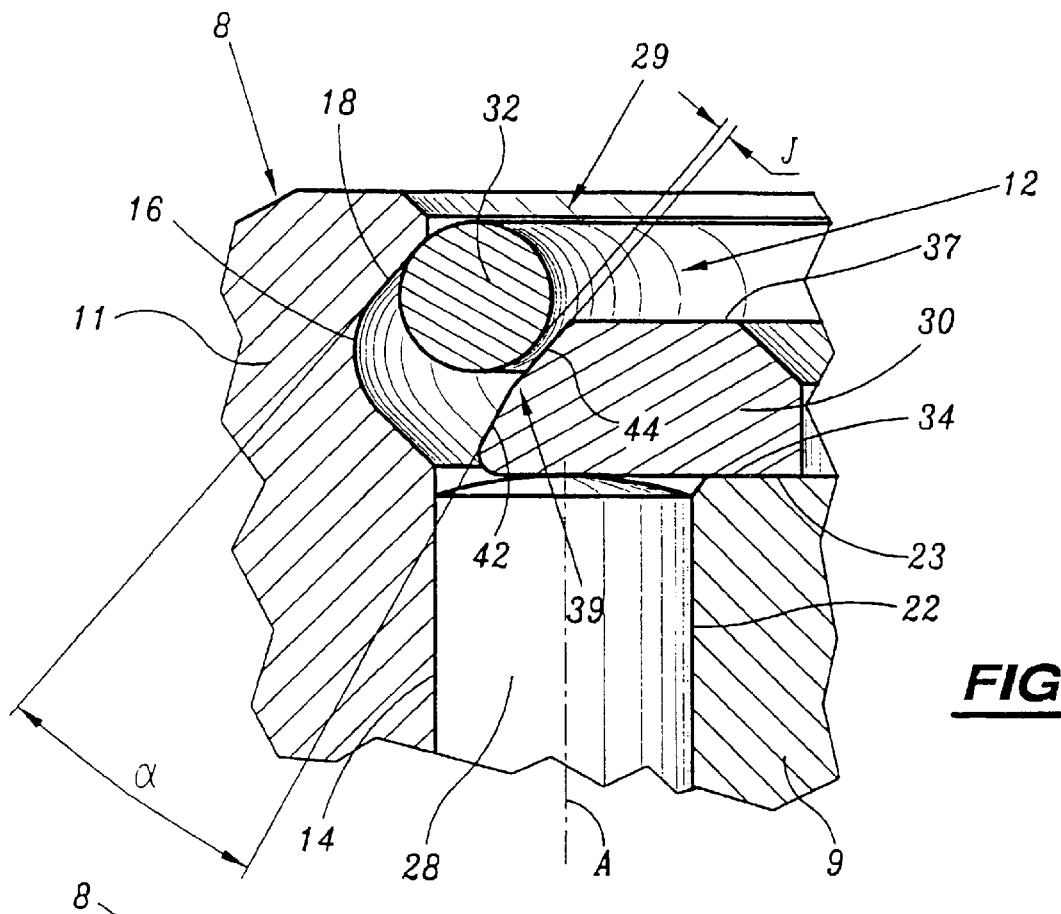
Figure 4:
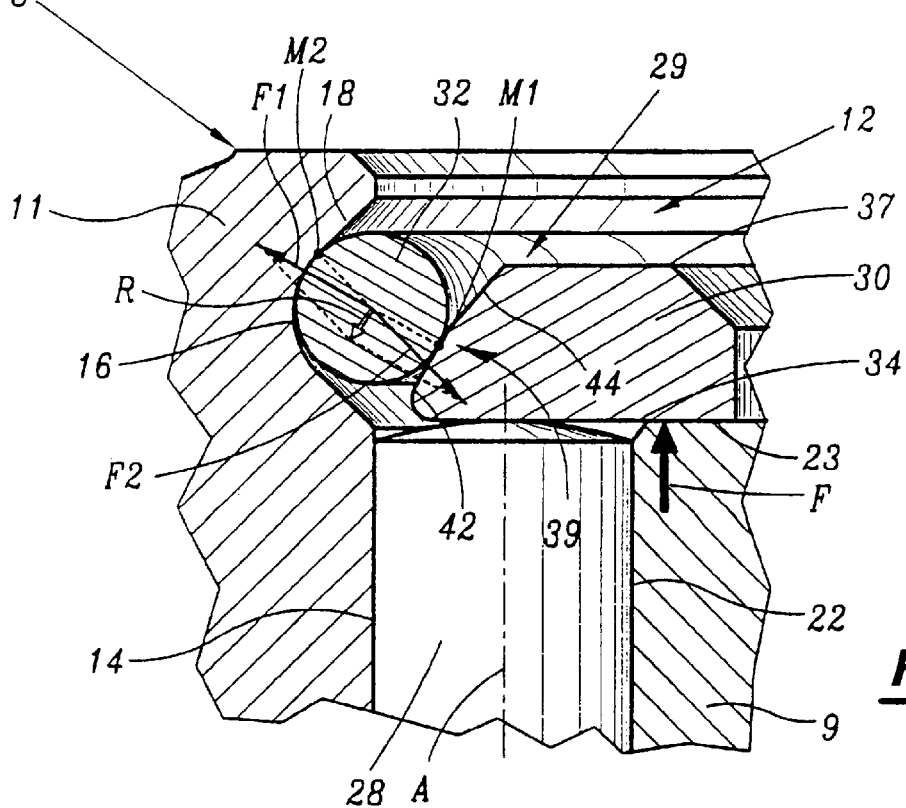
Figure 5:
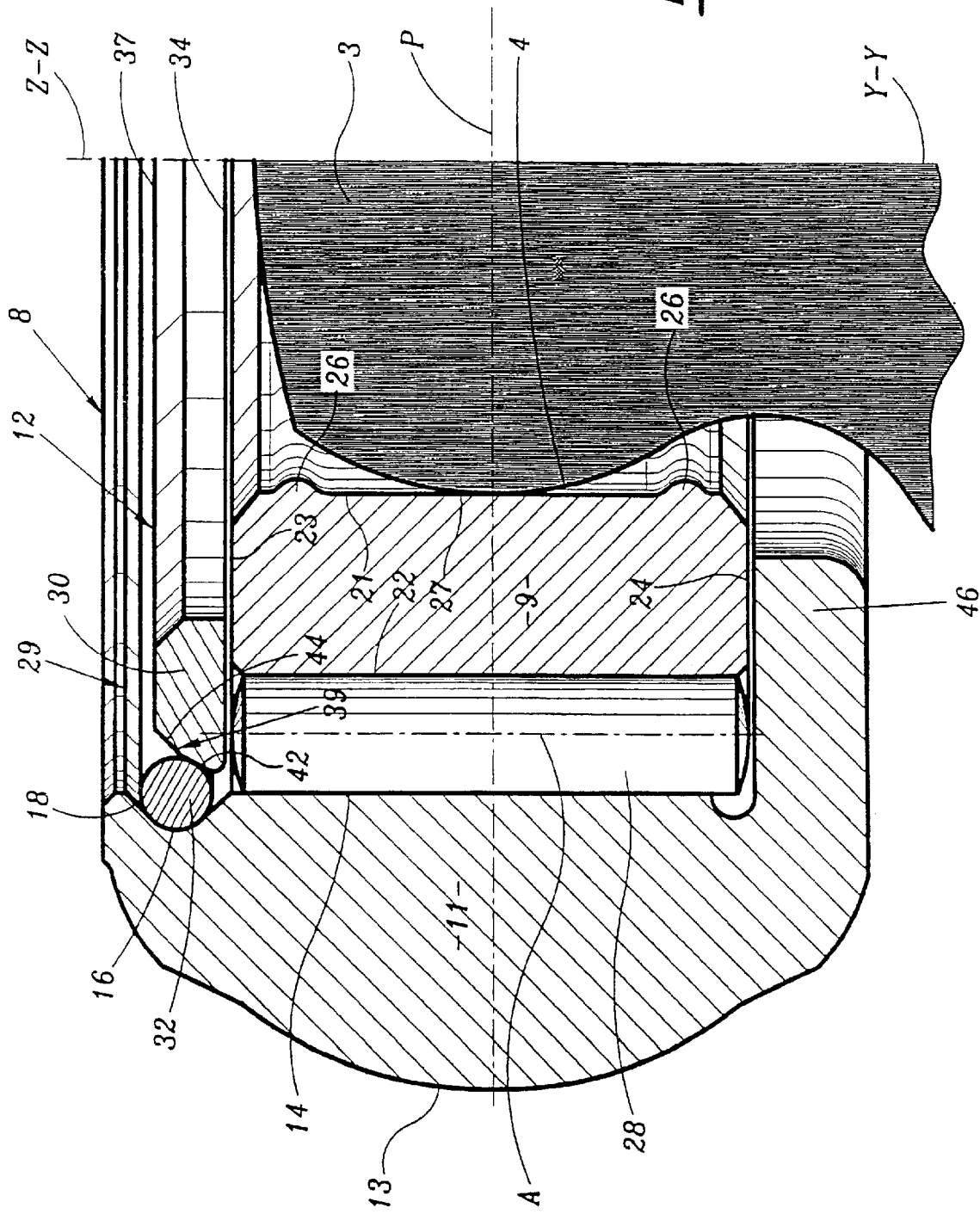

The invention will be better understood by reading the following description given merely by way of example and made with reference to the appended drawings in which:

FIG. 1 is a view in cross section of a mechanical tripod constant-velocity joint according to the invention, FIG. 2 is an enlarged view of circled part II of FIG. 1, illustrating the cross section of one mechanical transmission member of the joint, FIG. 3 is an enlarged view of circled part III of FIG. 2, illustrating the assembly of the transmission member of FIG. 1, FIG. 4 is a view similar to FIG. 3, illustrating the operation of the retaining means of the transmission member of FIG. 3, FIG. 5 is a view similar to FIG. 2, illustrating an alternative form of the transmission member of FIGS. 1 to 4, and FIGS. 6 and 7 are views similar to FIG. 3, schematically illustrating other alternative forms of the mechanical transmission member of FIGS. 1 to 4.

The constant-velocity joint illustrated in FIGS. 1 to 4, intended for a motor vehicle transmission, essentially comprises the following parts.

(1) A male element or tripod 1 comprising a hub 2, of central axis X—X, from which there project three radial arms 3 spaced angularly by 120°. The end part of each arm 3 forms a spherical bearing surface 4 which is formed as an integral part and centred on the axis Y—Y of the corresponding arm 3. This male element 1 is secured to a first rotary shaft 5.

(2) A female element or bell housing 6, of which the central axis X'—X', when the joint is in the aligned position depicted, coincides with the axis X—X. On each side of each arm 3, this bell housing 6 has two race tracks 7 facing each other. The orientation of these tracks is, for example, essentially straight and parallel to the axis X'—X', and their profile is curved in a plane transversal to the axis X'—X', such as the plane of FIG. 1. This female element 6 is secured to a second rotary shaft, not depicted.

(3) For each arm 3, a mechanical transmission member 8 of axis of revolution Z—Z coincident with the axis Y—Y of the corresponding arm 3 in the position depicted in FIG. 1. The transmission member 8 is also symmetrical with respect to its mid-plane P orthogonal to the axis of symmetry Z—Z.

As the three members 8 are identical, just one will be described hereinbelow. In the course of this description, the terms radial, axial, longitudinal, transversal are to be understood as being with respect to the member described and therefore its axis Z—Z.

As illustrated by FIG. 2, the member 8 comprises an inner race ring 9 of cylindrical overall shape of axis Z—Z, an outer race ring or roller 11 which is of revolution about the axis Z—Z and surrounds the race ring 9, and means 12 of coupling the inner race ring 9 and the outer roller 11 together.

The outer roller 11 comprises a radially outer surface 13, which has a curved profile in a longitudinal plane (such as the plane of FIG. 2), intended to run along one or other of the tracks 7 of the corresponding pair of tracks 7, and a radially inner surface 14 which is essentially cylindrical of axis Z—Z.

Two annular grooves 16 and 17 of axis Z—Z, separated axially from one another, are formed in the surface 14.

A first groove (which is an upper groove in FIG. 2) 16 is formed near the upper end of the outer roller 11. A second groove 17 (which is a lower groove in FIG. 2) is formed near the lower end of the outer roller 11.

The grooves 16 and 17 have a profile, in a longitudinal plane, shaped as a V with a very rounded point.

The axially outer surface 18, 19 of each groove 16, 17 converges axially towards the outside of the member 8, with the same angle of convergency.

The inner race ring 9 has a radially inner surface 21 delimiting an opening for housing the corresponding arm 3, and a radially outer surface 22, both essentially cylindrical.

The inner race ring 9 has two axially outer surfaces 23 and 24, these being the upper surface and the lower surface (in FIG. 2) respectively, which are essentially flat and orthogonal to the axis Z—Z.

Two annular retaining bulges 26, of axis Z—Z, axially offset from one another and formed as integral parts, are provided on the surface 21, near, respectively, the surfaces 23 and 24 of the inner race ring 9. The bulges 26 delimit between them a cylindrical surface 27 for interaction with the bearing surface 4 of the corresponding arm 3.

The axially outer ends of the surface 21 are chamfered and diverge axially towards the outside of the member 8.

The coupling means 12 comprise a circular row of needles 28 with axes A parallel to the axis Z—Z, and means 29 of axial retention comprising two axial thrust washers 30 and 31 and two split elastic snap rings 32 and 33 of circular cross section.

The circular row of needles 28 is placed between the surface 22 of the race ring 9 and the surface 14 of the roller 11, between the two grooves 16 and 17.

The washers 30 and 31 are placed one on each side of the inner race ring 9 with respect to the axis Z—Z, each one facing one of the surfaces 23 and 24.

The thrust washers 30 and 31 have, respectively, bearing surfaces 34 and 35 which are axially on the inside of the member 8, and respective bearing surfaces 37 and 38 which are axially on the outside of the member 8.

The bearing surfaces 34, 35, 37 and 38 are essentially flat and orthogonal to the axis Z—Z.

The outer peripheral edge faces 39 and 40 of the thrust washers 30 and 31 have, in succession, starting from their inner bearing surfaces 34 and 35, frustaconical bearing surfaces 42 and 43 followed by frustaconical surfaces 44 and 45 for insertion of the snap rings 32 and 33.

Each bearing surface 42, 43 converges axially, towards the outside of the member 8, with an angle of convergence with respect to the axis Z—Z which is less, by an angle α (FIG. 3), than that of the retaining surface 18, 19 of the corresponding groove 16, 17.

Each insertion surface 44, 45 converges axially, towards the outside of the member 8, with an angle of convergence with respect to the axis Z—Z equal to that of the associated retaining surface 18, 19.

The split O-shaped snap rings 32 and 33 are housed respectively in the grooves 16 and 17 of the outer roller 18.

The washers 30 and 31 are arranged axially between the snap rings 32 and 33 and hold the race ring 9 and the circular row of needles 28 between them, with a small amount of play.

The axially outer ends of the needles 28 and the surfaces 23 and 24 of the race ring 9 face the bearing surfaces 34 and 35 of the thrust washers 30 and 31.

To assemble the mechanical transmission member 8 of FIGS. 1 and 2, the snap ring 33 is first of all, and for example manually, placed into the groove 17 by elastic deformation, then the thrust washer 31, the circular row of needles 28 and the inner race ring 9, followed finally by the thrust washer 30, are stacked on top of the snap ring 33. These ready-assembled elements of the member 8 are then compressed, for example manually, in the axial direction (downwards in FIGS. 2 and 3) which by compensation of play, forms (FIG. 3) a space between the surface 18 of the groove 16 and the surface 44 of the washer 30, which surfaces are parallel, leaving just enough clearance J for the snap ring 32 to be inserted, for example manually, into the groove 16 by elastic deformation.

Once the snap ring 32 has reached the bottom of the groove 16, the compression on the elements of the mechanical transmission member 8 is then released, and this mechanical transmission member 8 is now assembled.

The member 8 is then placed on the corresponding arm 3 by elastic engagement by virtue of elastic deformation of the lower bulge 26 (in FIG. 2).

The inner race ring 9 rolls and slides with respect to the axis Y—Y on the arm 3. The bulges 26 are retaining bulges which restrict the sliding of the inner race ring 9 on the arm 3.

FIG. 4 illustrates the operation of the means 29 of axially retaining the inner race ring 9 with respect to the outer roller 11 when a force F is exerted on the race ring 9, axially towards the thrust washer 30.

A force F1 is therefore transmitted via the bearing surface 42 of the washer 30 to the elastic snap ring 32, which is compressed against the retaining surface 18 of the groove 16, which exerts a force F2 on the snap ring 32. The point M1 of application of the force F1 is the point of contact between the surface 42 and the snap ring 32. The point M2 of application of the force F2 is the point of contact between the snap ring 32 and the surface 18.

By virtue of the angle $\alpha$ formed between the bearing surface 42 and the retaining surface 18, the resultant R of the forces F1 and F2 exerted on the snap ring 32 is directed axially towards the inside of the member 8 and radially towards the outside of the member 8, which tends to keep the snap ring 32 in the bottom of the groove 18, in spite of the orientation of the force F, and tends thus to prevent relative translation of the inner race ring 9 and outer roller 11 with respect to the axis Z—Z, upwards in FIG. 4.

The operation of the means 29 of axial retention when faced with a force F in the opposite direction, involves the washer 31 and the snap ring 33 in a similar way.

The shape of the washers 30 and 31, of the snap rings 32 and 33 and of the grooves 17 and 18 lead to a less weakened mechanical transmission member 8.

In addition, the cost of production of the washers 30 and 31, of the snap rings 32 and 33 and of the V-shaped grooves 16 and 17 is lower than that of the grooves and thrust washers of a mechanical transmission member of the state of the art.

More generally, the insertion surfaces 44 and 45 may converge axially towards the outside of the member 8 with an angle which may be greater than or equal to that of the surfaces 18 and 19 of the grooves 16 and 17.

Finally, the mechanical transmission member 8 can be assembled and put together manually and is therefore particularly economical in comparison with mechanical transmission members of the state of the art.

Moreover, the coupling means may comprise, on the one hand, just the washer 30 and the snap ring 32 and, on the other hand, an annular transverse shoulder of axis Z—Z. In an alternative form illustrated in FIG. 5, this shoulder 46 is provided on the roller 11, at the lower end (at the bottom in FIG. 5) of the surface 14. By contacting the inner race ring 9, a shoulder such as this affords relative axial retention of this race ring 9 and of the roller 11, which retention was achieved previously using the washer 31 and the snap ring 33.

Figure 6:
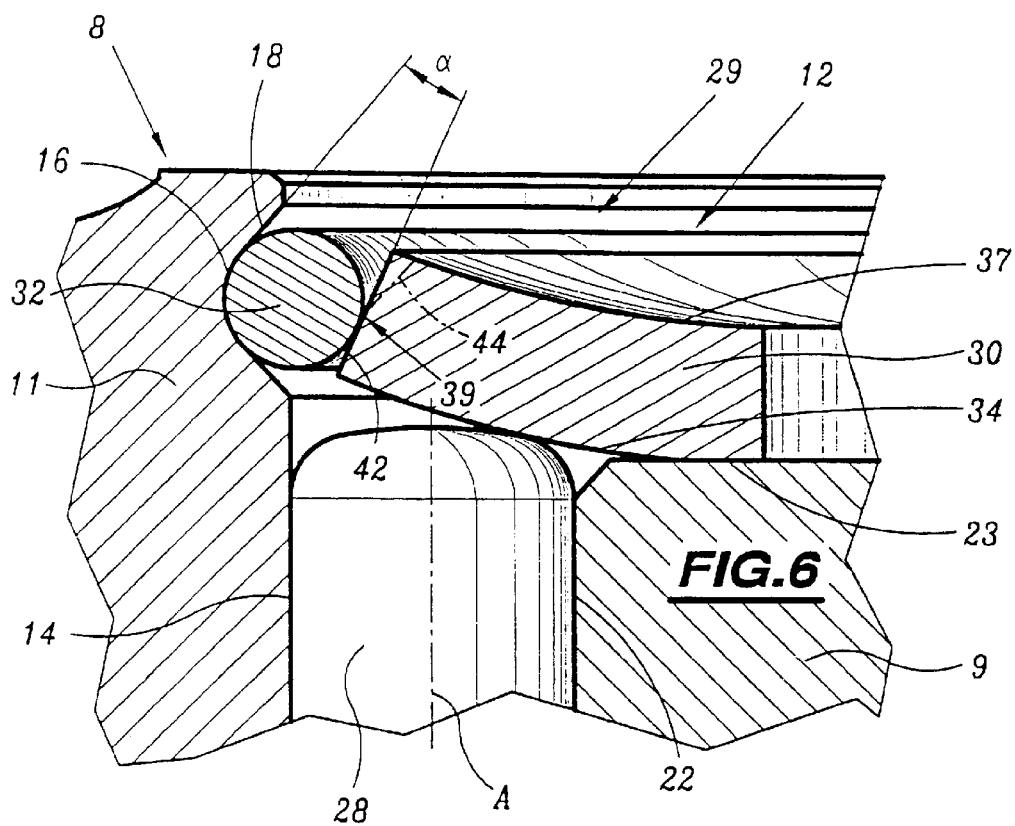

FIG. 6 illustrates an alternative form of the transmission member of FIGS. 1 to 4, differing from the latter essentially in the shape of the thrust washers 30 and 31.

The thrust washers 30 and 31 then have a concaveness facing axially towards the outside of the member 8. The bearing surfaces 34, 35, 37 and 38 of the washers 30 and 31 are therefore curved, and their peripheral edge faces 39 and 40 are orthogonal to the peripheral outer parts of these bearing surfaces 34, 35, 37 and 38. The edge faces 39 and 40 constitute the bearing surfaces 42 and 43 of the washers 30 and 31.

The dimensions of the washers 30 and 31 are such that, on the one hand, by compensating for the play of the stacked-up parts in the member 8, prior to insertion of the snap ring 32 when assembling the member 8, enough space is left between the retaining surface 18 and the surface 42 for the insertion of the snap ring 32 and, on the other hand, after assembly, an angle $\alpha$ is formed between the bearing surfaces 42 and 43 and the corresponding retaining surfaces 18 and 19.

This alternative form makes it possible to increase the strength of the axial retention between the inner race ring 9 and the outer roller 11 through the buttressing effect of the thrust washers 30 and 31, with a very low risk of fracture of the rollers, the washers or the snap rings.

It will be noted that, in this alternative form, any contact eventually occuring between the inner bearing surfaces 34 and 35 of the thrust washers 30 and 31, and the needles 28 of the circular row 28 of needles, occurs at points distant from the longitudinal axes A of the needles, namely closer to the axis Y—Y than the former axes, in contrast to what was the case with the mechanical transmission member 8 in FIGS. 1 to 4.

As depicted in dash-dotted line in FIG. 6, in another alternative form, chamfered parts of the edge faces 39 and 40 of the washers 30 and 31, which parts are axially external to the member 8, constitute insertion surfaces 44 and 45 (of which only the surface 44 is visible) parallel to the surfaces 18 and 19.

Figure 7:
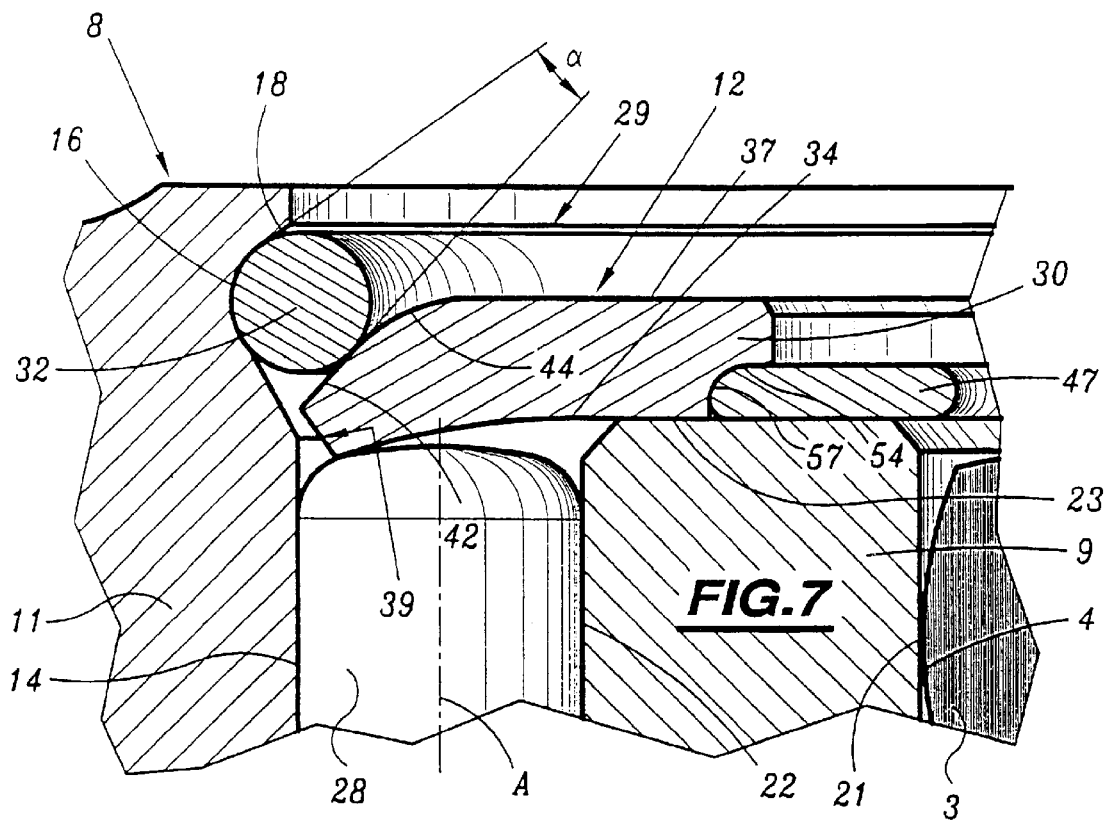

FIG. 7 diagrammatically illustrates another alternative form of the mechanical transmission member of FIGS. 1 to 4, which differs essentially from the latter in that the thrust washers 30 and 31 have a concaveness facing axially towards the inside of the mechanical transmission member 8, in that the bulges 26 are absent, and in that retaining washers 47 (only one of which is visible) have been fitted respectively between the thrust washers 30 and 31 and the surfaces 34 and 35 of the inner race ring 9.

The bearing surfaces 34, 35, 37 and 38 of the thrust washers 30 and 31 converge axially towards the outside of the mechanical transmission member 8 increasingly until they become orthogonal to the axis Z—Z.

The peripheral parts of the bearing surfaces 37 and 38 respectively constitute the bearing surfaces 42 and 43 of the thrust washers 30 and 31 and form an angle a with the retaining surfaces 18 and 19 of the grooves 16 and 17. The insertion surfaces 44 and 45 consist of adjacent and more central parts of the bearing surfaces 37 and 38.

The washers 47 are flat washers which bear, on the one hand, on the respective surfaces 23 and 24 of the inner race ring 9 and, on the other hand, on parts 54 of surfaces 34 and 35 delimiting annular counterbores 57 formed at the radially inner edges of the thrust washers 30 and 31.

The retaining washers 47 advance radially towards the axis Y—Y beyond the surface 21 of the inner race ring 9.

In this alternative form, the retaining washers 47 act like the bulges 26 of the member 8 of FIGS. 1 to 4 by axially retaining the mechanical transmission member 8 with respect to the corresponding arm 3.

In addition, in this alternative form, any contact there might be between the thrust washers 30 and 31 and the needles of the circular row of needles 28, occurs at points away from the longitudinal axes a of the needles, and more specifically further away from the axis Y—Y than these axes A.

What is claimed is:

1. A mechanical transmission member (8) comprising an inner race ring (9), an outer race ring (11) surrounding the inner race ring and means (12) for coupling the inner and outer race rings together allowing them to pivot relative to one another about their common axis (Z—Z), the coupling means (12) comprising means (29) for axially retaining the outer race ring with respect to the inner race ring, said retaining means (29) comprising at least one axial inside of the outer race ring (11) and with a surface (23, 24) which is axially on the outside of the inner race ring (9), said retaining means (29) further comprising at least one elastic snap ring (32, 33), especially a split ring, interacting with a retaining surface (18, 19) which is axially on the outside of the groove (16, 17) and with a bearing surface (42, 43) of the thrust washer (30, 31) for axially retaining the latter, wherein the retaining surface (18, 19) of the corresponding groove (16, 17) converges axially towards the outside of the member (8), and wherein the bearing surface (42, 43) of the corresponding thrust washer (30, 31) converges axially towards the outside of the member (8) to a lesser extent than the said retaining surface (18, 19).

2. A mechanical transmission member according to claim 1, wherein the elastic snap ring (32, 33) is of approximately circular cross section.

3. A mechanical transmission member according to claim 1, wherein said bearing surface (42, 43) is extended axially towards the outside of the member (8) by a surface (44, 45) for insertion of said snap ring (32, 33), this insertion surface converging axially towards the outside of the member (8) at an angle which is at least equal to that of the said retaining surface (18, 19) of the groover (16, 17).

4. A mechanical transmission member according to claim 3, wherein said retaining surface (18, 19) and the said bearing surface (42, 43) are approximately frustaconical.

5. A mechanical transmission member according to claim 1, wherein said thrust washer (30, 31) has a concaveness facing axially towards the outside of the member (8) and wherein at least part of the peripheral edge face (39, 40) of this thrust washer peripheral edge face (39, 40) of this thrust washer constitutes the said bearing surface (42, 43).

6. A mechanical transmission member according to claim 1, wherein said thrust washer (30, 31) has a concaveness facing axially towards the inside of the member (8) and wherein part of the axially outer surface (37, 38) of the said thrust washer (30, 31) constitutes the said bearing surface (42, 43).

7. A mechanical transmission member according to claim 1, wherein the member (8) is intended to be mounted on an arm (3) about which the inner race ring rolls and slides, and wherein the member further comprises at least one element (47) projecting radially inwards with respect to the inner race ring (9), for axially retaining the member (8) on the arm (3).

8. A mechanical transmission member according to claim 7, wherein said retaining element is a retaining washer (47) which, on the one hand, is held between the thrust washer (30, 31) and the corresponding axially outer surface (23, 24) of the inner race ring (9) and, on the other hand, is intended to interact with the said arm (3) to provide the said axial retention.

9. A mechanical transmission member according to claim 8, wherein the radially outer edge of said retaining washer (47) is housed in a counterbore (57) of the radially inner edge of the corresponding thrust washer (30, 31).

10. A constant-velocity mechanical joint, comprising a male element (1) comprising several arms (3), a female element (6) delimiting two race tracks (7) for each arm (3) and, for each arm (3), a mechanical transmission member (8) mounted on said arm (3), the mechanical transmission member (8) comprising an inner race ring (9) that can swivel about said arm, an outer race ring forming a roller (11) surrounding the inner race ring and rolling along the two associated race tracks (7) of the female element (6), and means (12) for coupling the race ring and the roller in a pivoting way allowing relative pivoting about their common axis (Z—Z), wherein at least one mechanical transmission member (8) is a mechanical transmission member wherein the coupling means (12) comprise means (29) for axially retaining the outer race ring with respect to the inner race ring, these retaining means (29) comprising at least one axial thrust washer (30, 31) which interacts with an annular groove 16, 17) radially on the inside of the outer race ring (11) and with a surface (23, 24) which is axially on the outside of the inner race ring (9), the axial retaining means further comprising at least one elastic snap ring (32, 33), especially a split ring, interacting with a retaining surface (18, 19) which is axially on the outside of the groove (16, 17) and with a bearing surface (42, 43) of the thrust washer (30, 31) for axially retaining the latter, wherein the retaining surface (18, 19) of the corresponding groove (16, 17) converges axially towards the outside of the mechanical transmission member, and in that the bearing surface (42, 43) of the corresponding thrust washer (30, 31) converges axially towards the outside of the mechanical transmission member to a lesser extent than the said retaining surface (18, 19).

\* \* \* \* \*